United States Patent [19]

Lee

[11] Patent Number: 4,879,706
[45] Date of Patent: Nov. 7, 1989

[54] METHOD AND APPARATUS FOR FOCUS AND TRACKING IN AN OPTICAL DISK SYSTEM

[75] Inventor: Wai-Won Lee, Capertino, Calif.

[73] Assignee: Laser Magnetic Storage International Company, Colorado Springs, Colo.

[21] Appl. No.: 79,653

[22] Filed: Jul. 29, 1987

[51] Int. Cl.$^4$ .......................... G11B 5/09; G11B 20/22
[52] U.S. Cl. ........................................ 369/45; 369/44
[58] Field of Search ..................................... 369/44, 45

[56] References Cited

U.S. PATENT DOCUMENTS

| | | | |
|---|---|---|---|
| 3,701,602 | 10/1972 | Bergin et al. | 356/152 |
| 3,894,276 | 7/1975 | Janssen | 318/135 |
| 3,974,327 | 8/1976 | Van Dijk | 178/6.6 R |
| 3,975,630 | 4/1976 | Zorn | 250/202 |
| 4,011,400 | 3/1977 | Simons et al. | 358/127 |
| 4,067,044 | 1/1978 | Maeda et al. | 358/128 |
| 4,123,652 | 10/1978 | Bouwhuis | 250/204 |
| 4,241,423 | 12/1980 | Burke et al. | 365/215 |
| 4,293,944 | 10/1981 | Izumita et al. | 369/45 |
| 4,358,200 | 11/1982 | Heemskerk et al. | 356/123 |
| 4,410,969 | 10/1983 | Maeda | 369/46 |
| 4,417,330 | 11/1983 | Hazel et al. | 369/32 |
| 4,435,797 | 3/1984 | Hsieh et al. | 369/32 |
| 4,437,177 | 3/1984 | Watanabe et al. | 369/45 |
| 4,443,870 | 4/1984 | Hazel et al. | 369/44 |
| 4,445,208 | 4/1984 | Yamamoto et al. | 369/44 |
| 4,446,546 | 5/1984 | Miller | 369/45 |
| 4,458,980 | 7/1984 | Ohki et al. | 350/3.73 |
| 4,464,741 | 8/1984 | Compaan | 369/45 |
| 4,482,988 | 11/1984 | Tsurushima et al. | 369/45 |
| 4,497,048 | 1/1985 | Kimura | 369/46 |
| 4,498,110 | 2/1985 | Kimura | 358/342 |
| 4,506,149 | 3/1985 | Utsumi | 250/202 |
| 4,585,933 | 4/1986 | Ando | 250/201 |

OTHER PUBLICATIONS

Wai-Hon, Lee, High Efficiency Multiple Beam Gratings, Applied Optics, vol. 18, No. 13, Jul. 1, 1979.
Braat, J. J. M. and G. Bouwhuis, "Position Sensing in Video Disk Readout", Applied Optics, vol. 17, pp. 2013-2021.

Primary Examiner—William L. Sikes
Assistant Examiner—Robert E. Wise
Attorney, Agent, or Firm—Sheridan, Ross & McIntosh

[57] ABSTRACT

Method and apparatus useful in monitoring and adjusting focus and tracking of a read/write beam in a data disk-storage system are provided. In one embodiment, the reflected beam is split into a plus first order, astigmatically focused first beam and a minus first order astigmatically focused second beam. The two beams produce images which change in a mirror symmetric fashion in response to changes in the focus or tracking but in a parallel fashion in response to changes in the optical axis. Signals from detectors of the two beams are combined to negate the influence of optical axis movement or other optical faults. In another embodiment, a beam reflected from the disk is split into a first beam converging on an image plane and a second beam defocused at the image plane. The second beam has a relatively large diameter at the image plane and is relatively insensitive to optical axis deviations. Phase relationships of the second beams are used to determine if the beam impinging on the disk is focused. By combining signals from the first and second beams, the resultant signal is insensitive to optical axis errors and indicates the magnitude and direction of focus correction needed. The second beam is also used in monitoring or measuring tracking of the read/write beam. In both embodiments, the beam splitting is preferably produced by a zone plate.

20 Claims, 5 Drawing Sheets

PRIOR ART

→ TO DISC
← FROM DISC

PHASE = $360 \left(\frac{t}{T}\right)$ DEGREE

METHOD AND APPARATUS FOR FOCUS AND TRACKING IN AN OPTICAL DISK SYSTEM

FIELD OF THE INVENTION

The present invention relates to information storage on rotatable disks and particularly to apparatus and method for monitoring and controlling tracking and focusing of a light beam with respect to an optically readable disk.

BACKGROUND OF THE INVENTION

Disk-type data storage systems, and particularly optically readable disk systems, require proper placement of a focused beam of light, such as a laser beam, with respect to the disk. Placement in the axial direction, i.e. towards or away from the disk surface, involving focusing of the light beam and placement in the radial direction, referred to as tracking, are needed to assure that a light beam of the required size and intensity impinges on the disk at the desired location.

Methods for monitoring and controlling tracking and focusing of the beam typically involve detection of characteristics of at least a portion of the beam which is reflected from the disk surface. One such system is described in U.S. Pat. No. 4,446,546 issued May 1, 1984 to Miller. This system uses a quadrature detector which produces an "S" curve for use in focus control.

A persistent problem with such systems is that commonly-used detecting devices are unable to distinguish between characteristics which result from defocusing or track crossing and characteristics which result from other changes in the optical system such as movement or misalignment of the optical axis of the reflected beam or misalignment of optical components of the system. Because of this inability to distinguish, a misalignment of some components of the optical system can result in the detector system producing a focus control signal or a tracking control signal which is erroneous, i.e. which causes the focused point of the light beam to be positioned away from the desired position.

A number of methods have been devised to overcome or compensate for the lack of signal discrimination. If the optical detectors are relatively small compared to the size of the beam being detected, movement of the beam axis with respect to the detectors may leave the detectors substantially within the beam and thus substantially unaffected by such movement. However, for many focus correction systems, the beam being detected must be focused on the detector. Producing a focused spot which is sufficiently large to avoid the effects of axis movement during the anticipated life of the device places constraints on other components, such as lens apertures and bit density, which make this solution impractical and expensive to implement.

The tracking system can be separated from the focus system by, for example, a beam splitting arrangement intended to provide a relatively error-free tracking system. However, by splitting the optical path into two optical paths which pass through different optical elements, events such as optical axis movement in one path may not occur in the other path and thus signals related to one optical path may not be useful in correcting errors in the other optical path. Furthermore, this arrangement is beneficial only to the tracking system and does not solve problems associated with the focus system.

Conversely, systems such as that disclosed in U.S. Pat. No. 4,123,652, issued Oct. 31, 1978 to Bouwhuis, include a focusing system which is intended to overcome certain optical faults. However, Bouwhuis does not disclose overcoming optical faults in the tracking system. Furthermore, Bouwhuis requires splitting of the optical path thus creating the possibility for independent optical faults in the two optical paths.

Accordingly, there is a need for a system for tracking and focusing an optical beam which is insensitive to optical faults such as beam axis movement or component misalignment and which does not involve subjecting split beams to independent optical faults.

SUMMARY OF THE INVENTION

The present invention involves apparatus and methods useful in maintaining focus of a light beam on a data disk and maintaining tracking of a light beam on a data disk.

In a first embodiment, a light beam is reflected from the data disk and the reflected beam is subjected to the influence of an optical element which simultaneously produces two beams. The two beams are preferably a plus first order beam converging to form a first image on an image plane and a minus first order beam converging to form a second image, preferably on the same image plane. The two images are thus focused preferably on a single image plane, spaced from each other. The first image changes in a mirror symmetric fashion with respect to changes in the second image when there is a change in the focusing of the read/write beam on the disk. The first image also changes in a mirror symmetric fashion with respect to changes in the second image when there is a change in tracking of the read/write beam with respect to the disk, for example, when there is detection of a track crossing, a bit edge, or track servo bit. However, the first image changes in a parallel fashion with respect to changes in the second beam when there is a change in the optical axis of the reflected beam. Because the undesired changes resulting from optical faults, for example, optical axis movement, create parallel results in the two images, the two images can be combined in a fashion to nullify such unwanted effects, and thereby to produce a combined signal which reflects substantially only changes in tracking or focusing and which is substantially unresponsive to changes in the optical axis of the reflected beam.

According to this first embodiment, the optical element can also produce a zero order beam which preferably converges to form a third image on the image plane which is useful for detecting modulation of the read/write beam by the disk. The optical element has an astigmatizing influence on the plus first order and minus first order beams, useful in connection with the focusing system. The optical element can be configured to produce astigmatism of the first beam which is mirror symmetrically oriented with respect to the astigmatism of the second beam. In this manner, a single element can produce a desired relationship of two astigmatic focus lines, for example, an orthogonal relationship, without the necessity for separately aligning two different optical elements, such as two lenses.

In a second embodiment, the light beam is reflected from the data disk and the reflected beam is subjected to the influence of an optical element which again simultaneously produces two beams. The first beam is astigmatically focused by the same optical element to an image in an image plane. The second beam is affected by the same optical element so as to be defocused in the image plane. The first and second beams are preferably coaxial. Two different detecting means are used for the first and second beams. The first detector means detects the focused image from the first beam. The first detector is preferably a quadrature detector which produces an "S" curve from the astigmatically focused first beam. The second detector includes substantial portions outside the image from the first beam and is responsive to the defocused second beam. The second detector, being substantially smaller than the size of the defocused second beam, is substantially unaffected by optical faults such as movement of the optical axis of the defocused beam. The phase relationship detected by the second detector is used to modify the "S" curve produced by the first detector. The resultant signal is related to the degree of focus of the beam on the disk and is substantially unaffected by movement of the optical axis.

The second detector is also used in monitoring and controlling tracking of the beam with respect to the disk. As noted, the tracking signal is relatively unaffected by optical faults, such as movement of the optical axis, because, as noted, the second detector is relatively small compared to the size of the defocused second beam at the image plane.

The single optical element which accomplishes creation of two beams in both the first and second embodiments is preferably a zone plate. By using a single optical element, as opposed to a combination of elements such as a number of lenses, material expense and production and maintenance costs are reduced. Furthermore, even when a number of optical components are combined to produce the desired effect, the first beam and second beam both pass through the same optical elements so that conditions causing an optical fault in one of these beams also causes an optical fault in the other. For this reason, a signal from a detector of one beam can be combined with a signal from the detector of the other beam to produce a final signal which is relatively free from the influence of optical faults.

According to both embodiments of the invention, the detector apparatus can be provided in a single compact device because the detectors are all preferably located in a single image plane and are located close together. By providing a single compact device, material and construction costs are minimized and maintenance requirements are reduced.

DETAILED DESCRIPTION OF THE PREFERRED EMBODIMENT

Figures 1, 1A, 2A, 2B, 2C, 3, 3A:
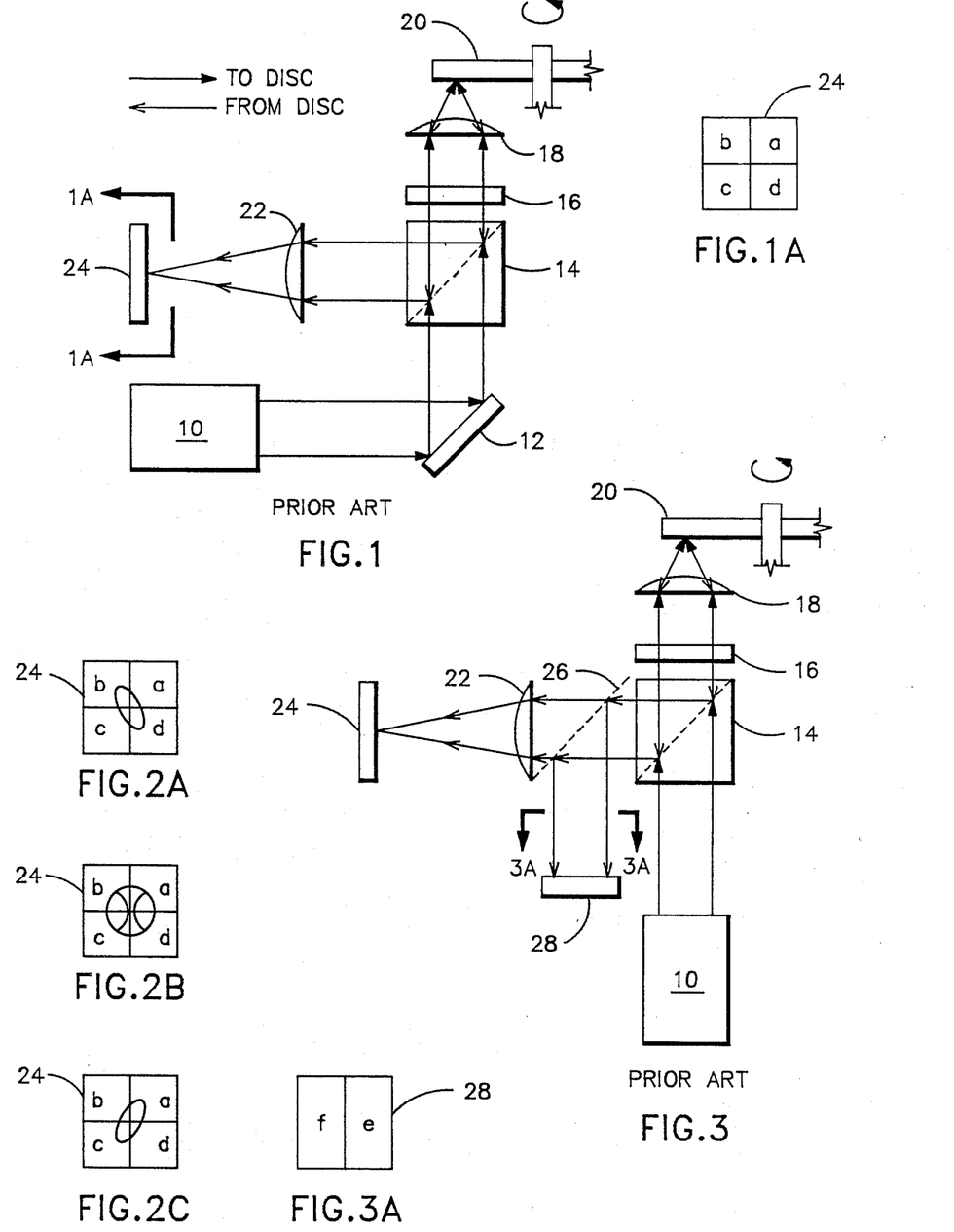
FIG. 1 is a schematic depiction of a system for focusing a coherent light beam onto a disk track and for generating focus and tracking signals.
FIG. 1A is a front view of a quadrant detector taken along Line 1A—1A of FIG. 1.
FIGS. 2A-2C depict the quadrant detector of FIG. 1A displaying three different focus conditions.
FIG. 3 is a schematic depiction of another focus and tracking signal sensing system.
FIG. 3A depicts the detector taken along Line 3A—3A of FIG. 3.

The present invention relates to tracking and focusing a light beam in connection with storage and retrieval of data in a disk data-storage system. Referring to FIGS. 1 and 1A, depicted therein is a prior art optical disk drive system in which a light beam is produced from a coherent light source 10, such as a semi-conductor laser, preferably with polarization parallel to the plane of incidence of the polarizing beam splitter 14. The beam is directed to a mirror 12, to a polarizing beam splitter 14, and through a quarter wave plate 16. The quarter wave plate 16 changes the linear polarized light which is transmitted by the polarization beam splitter into circular polarized light, as known. The laser beam is then focused onto the surface of the disk 20 by the objective lens 18 to a spot having a diameter of, e.g., about 1 micrometer or less on the surface of a recording medium 20, such as a conventional rotating disk. To achieve such a spot, the objective lens 18 with a large numerical aperture of, e.g., about 0.52 is used. With large numerical aperture optics, the depth of focus of such an objective lens is small. Therefore, it is desirable that the objective lens be maintained at a preferred distance from the medium surface 20 so that the light beam remains sharply focused on the plane of the information track on the disk 20. In an optical disk drive, the separation of the surface of the medium track and the objective lens may tend to vary due to, e.g., the vertical run out of the disk. This requires that some provision be made to detect these variations and to correct the focusing error in response thereto.

The disk medium 20 typically has a reflectance of 0.4. Reflected light from the disk 20 passes back through the objective lens 18, the quarter wave plate 16, off the polarizing beam splitter 14, through an astigmatic lens such as a toric lens 22, and is focused on a quad detector 24.

The toric lens 22 is fabricated by polishing two curvatures on the same glass piece. This type of lens suffers from spherical abberation and requires accurate centering in order to produce a uniform and well shaped beam for detection. Another method for producing such a lens with two foci is to emboss a thin layer of material with a cylindrical curvature on it. Such a lens is sometimes referred to as a bifocal lens and is of higher quality than a toric lens but at higher cost.

The light beam which is focused on the surface of the disk 20 should always remain centered on an information track as defined by track-defining systems such as by pregrooved portions to be read (or written), bit edges or tracking servo bits. Deviations from such centered position can produce a reduction of the modulation depth of the read-out signal and/or crosstalk between adjacent track portions. Centering of the focused beam on the desired track means that the center of the focused beam should coincide with the center of the track. In the case of an off-centered beam, the centers will not coincide. Therefore, the optical drive should include means for detecting the magnitude and the direction of a centering error of the focused beam relative to an information track to be accessed so that the position of the spot can be corrected.

As in a typical prior art optical drive apparatus, such as the Model LD1200 optical drive manufactured by Laser Magnetic Storage International Company of Colorado Springs, Colo., the tracking errors are obtained by combining detector signals generated by electrical detector zones, e.g., by combining in the fashion $$(a+d)-(b+c) \quad (1)$$

with reference to the quad detector 24 depicted in FIG. 1A. If the spot on the disk moves across, e.g., pregrooved data tracks, the intensity of the light on the quad detector 24 will fluctuate, producing a fluctuation in the signal from the detector. The fluctuation of this electrical detector signal is caused by the interference of the diffracted beams produced by the track-defining system.

The focus error signal is obtained by combining detector signals generated by electrical detector zones, e.g., by combining in the fashion $$(a+c)-(b+d) \quad (2)$$

with reference to the quad detector 24 depicted in FIG.1A.

The focus error signal is generated using the lens 22 which is usually a conventional toric lens as discussed above. Depending on the condition of the axial position of the focused spot with respect to the surface of the disk 20, the light pattern on the quadrant detector 24 will have one of the shapes illustrated in FIGS. 2A through 2C. When the spot is properly focused, the shape of the light is approximately symmetrical, as depicted in FIG. 2B.

The spot on the quad detector 24 as shown in FIG. 2B has equal intensity on all four quadrants of the quad detector 26. On the other hand, when the laser beam is not in proper focus on the surface of the disk 20, the spot on the quad detector 24 will be astigmatic and show preference to diagonally opposed quadrant portions of the quad detector 24, as depicted in FIGS. 2A and 2A. The electrical signal defined by Equation 2 taken from the quad detector 24 will be reduced (compared to the in-focus signal) when the focus is in error in a positive sense (as depicted in FIG. 2A) with the magnitude of the reduction being related to the magnitude of the focus error. The electrical signal obtained according to Equation 2 will be increased (compared to the in-focus signal) when the focus is in error in a negative sense (as depicted in FIG. 2C) with a magnitude related to the magnitude of the focus error. In this way, the error signal can provide both the direction and the magnitude of the focus errors.

Both the tracking and focus systems described suffer from a number of constraints and shortcommings. In the particular configuration of error signal generation described above, the tracking error signal in accordance with Equation 1 can only be accomplished when the spot is close to an optimum focused condition. Moreover, the spot as shown in FIG. 2B is rather small. In the Model LD1200 optical drive mentioned above, the spot diameter is about 250 micrometers. As a result, when the drive encounters different thermal environments, the thermal expansion of the mechanical parts coupling with stresses built into some of the adjustments parts causes the beam on the quad detector 24 to move from its pre-aligned position. This beam motion produces an electrical offset signal which reduces the accuracy in monitoring the tracking on the disk 20. For example, if the axis of an accurately focused beam shifts so as to move the spot shown in FIG. 2B towards quadrant b, the axis shift will cause the tracking error signal defined by Equation 1 to decrease, causing a change in tracking of the beam, even when the beam is properly centered.

Such beam motion also affects accuracy of the focusing system. The described axis shift will cause the quantity defined by Equation 2 to decrease and the resulting focus error signal will mimic the signal produced in an out-of-focus situation such as depicted in FIG. 2A. Thus, such an axis shift will cause the focus system to defocus a beam which is, in fact, accurately focused.

FIG. 3 depicts another prior art optical drive system in which the laser 10 directs a beam of coherent light through the polarizing beam splitter 14, the quarter wave plate 16, the objective lens 18 and onto the disk 20. The reflected beam passes back through the objective lens 18, through the quarter wave plate 16 and out of the polarizing beam splitter 14. A second beam splitter 26 divides the return beam into two beams. The tracking signal is sensed by a split detector 28, depicted in FIG. 3A. The focus error is sensed by passing the focus beam through a lens 22 to the quadrant detector 24. In this approach, the tracking signal detected on the split detector 28 becomes insensitive to the movements of, e.g., the mechanical mounts in the system. However, the focus error detected on the quad detector 24 is still influenced by beam tilt or other motion of the beam caused, e.g, by stresses built into the supporting mechanical mounts. Moreover, because the focus beam passes through the lens 22 while the tracking beam does not, no signal detected by detector 28 could be used to discriminate optical faults which occur only in the focus beam path, such as those that might be caused by misalignment of the lens 22.

Figure 4:
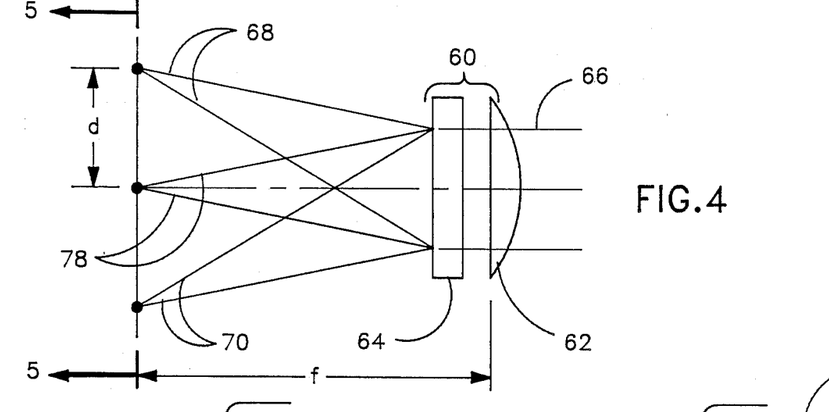
FIG. 4 is a schematic representation of a detector for sensing focus and tracking error according to a first embodiment of the invention.

According to a first embodiment of the invention, an optical element which produces two focused beams is used. As depicted in FIG. 4, an optical element 60 comprising, for example, a lens 62 and a zone plate 64, are placed in the path of at least a portion of the beam reflected from the disk 66. The characteristics and method of making a zone plate usable in this embodiment are discussed below. Briefly, a preferred zone plate for this embodiment would have raised or opaque regions in the shape of segments of ellipses. The effect of the optical element 60 is to produce two converging beams, a minus first order beam 68 and a plus first order beam 70. Each of these beams converges to an image plane which is preferably the same plane for both beams 72.

The optical element 60 provides the two beams 68, 70 with the characteristic that the shape and diffraction pattern of the beams at the image plane 72 change in a mirror symmetric fashion when there is a change in the focus or tracking of the read/write beam but change in a parallel fashion when there is a change in the optical axis of the reflected beam 66. Further, the optical element 60 imparts astigmatism to the two beams.

Figure 5:
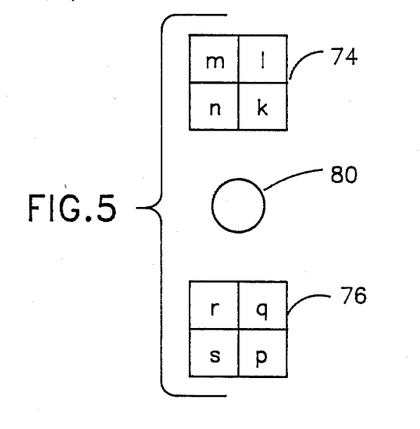
FIG. 5 is a front view of a detector taken along Line 5—5 of FIG. 4.

The first and second beams 68, 70 are detected using two quadrature detectors 74, 76 depicted in FIG. 5. The first quadrature detector 74 is positioned to detect the first beam 68 and the second quadrature detector 76 is positioned to detect the second beam 70. The quadrature detectors 74, 76 are located substantially at the image plane 72 of the two beams 68, 70.

The optical element 60 can also be configured to provide a third or zero order beam 78 which converges to an image plane preferably coplaner with the image plane 72 of the first and second beams 68, 70. In one embodiment of the invention, the diameter of the image at the image plane 72 of the zeroth order light beam 78 is about 10 microns. A third detector 80 is positioned to detect the third beam 78 to provide a signal related to modulation of the read/write beam by the data disk.

Figure 6A:
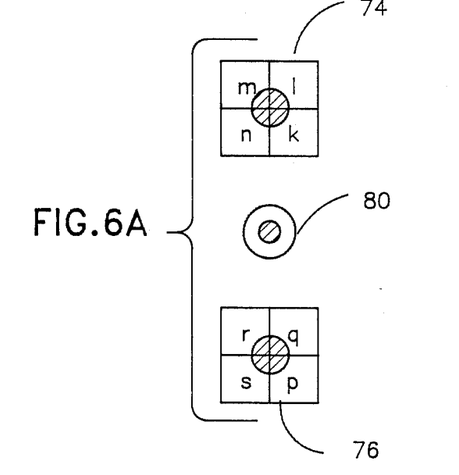
FIGS. 6A, B, C and D depict the quadrant detector of FIG. 4 displaying three different focus conditions and an axis movement.
Figure 6B:
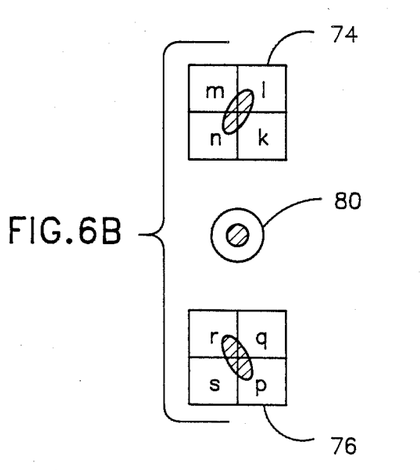
Figure 6C:
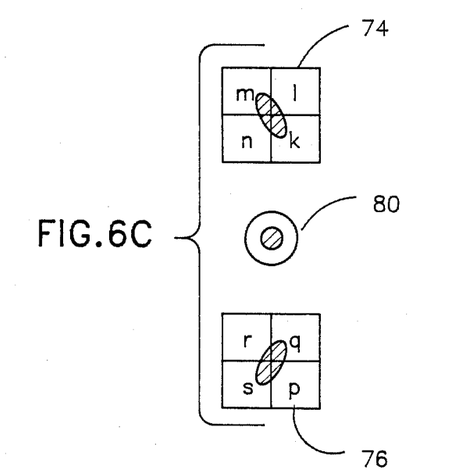
Figure 6D:
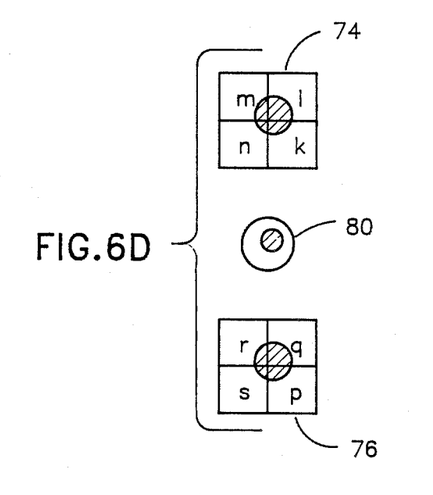

FIGS. 6A, 6B, 6C, and 6D schematically depict the pattern of light falling on the detectors 74, 76, 80 in the embodiment depicted in FIG. 4 for different focus and optical axis conditions. FIGS. 6A, B and C depict situations in which the optical axis has not shifted, i.e., in which the first and second beams 68, 70 are centered on the centers of the quadrature detectors 74, 76, respectively. FIG. 6A depicts the light pattern falling on the detectors 74, 76, 80 when the read/write beam is in focus. FIG. 6B depicts the light pattern falling on the detectors 74, 76, 80 when the read/write beam is out-of-focus with respect to the data disk in the positive sense. FIG. 6C depicts the light pattern falling on detectors 74, 76, 80 when the read/write beam is out-of-focus with respect to the data disk in the negative sense. FIG. 6D depicts the pattern falling on the detectors 74, 76, 80 when the read/write beam is in focus with respect to the data disk but the axis of the reflected beam 66 has shifted from the preferred or centered position.

According to this embodiment of the invention, the focus error signal is obtained by combining the outputs from the quadrature detectors k, l, m, n, p, q, r and s in the following manner:

$$[(k+m)-(l+n)]+[(q+s)-(p+r)]. \quad (3)$$

The tracking error signal, according to this invention, is obtained by combining the signals from the quadrature detectors in the following fashion:

$$[(k+n)-(l+m)]+[(q+r)-(p+s)]. \quad (4)$$

By combining the signals from the two quadrature detectors in this manner, both the focus error signal and the tracking error signal are sensitive to the focus and tracking conditions of the read/write beam with respect to the data disk, but are each relatively insensitive to optical faults such as changes in the optical axis of the reflected beam 66. As with the first embodiment, the ability to combine signals from two beams to produce a signal which is insensitive to optical faults is related to the fact that the two beams follow non-independent paths, i.e. each beam passes through the same optical elements.

A system generating non-independent beams is further useful in that when the astigmatism of the respective focus beams 68, 70 is produced by a single element 64, the astigmatic focus lines will be produced in a predetermined angular relationship, preferably orthogonal. Thus, there is no need to independently adjust two different optical elements such as cylindrical or toric lens to assure orthogonality of the astigmatic focus lines of the two beams 68, 70.

Figure 7A:
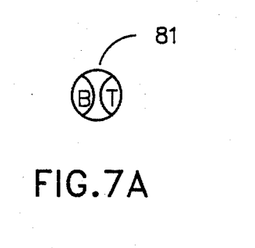
FIGS. 7A and B depict the diffraction pattern of the refracted beam before and after rotation by the optical element.
Figure 7B:
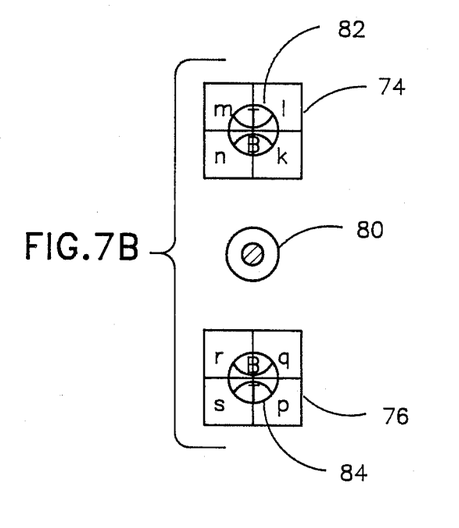

FIG. 7A depicts the position of the top and bottom diffraction patterns 81 (denoted T and B in FIG. 7A) at a point along the reflected beam 66 and FIG. 7B depicts the position of the diffraction patterns 82, 84 at the image plane 72. As can be seen from FIG. 7, the optical element 60 results in a ninety degree rotation of the diffraction patterns with respect to each other. The rotations imposed on the diffraction patterns in the first and second beams 68, 70 are mirror symmetric in the sense that when the diffraction pattern 82 of the first beam 68 is rotated 45 degrees in a counterclockwise direction, the diffraction pattern of the second beam 70 will be rotated 45 degrees in a clockwise direction. Because the diffraction patterns are rotated in opposite directions by the optical element 60, changes in the diffraction patterns which result from tracking events such as track crossing, bit edge detection or servo bit detection will be mirror symmetric at the two detectors 74, 76, while changes in the diffraction patterns which result from optical faults, such as movement of the optical axis of the reflected beam 66, will cause parallel movement of the diffraction patterns at the two detectors 74, 76. In this way, the tracking error signal obtained in accordance with Equation 4 will be relatively insensitive to optical faults.

Figure 8:
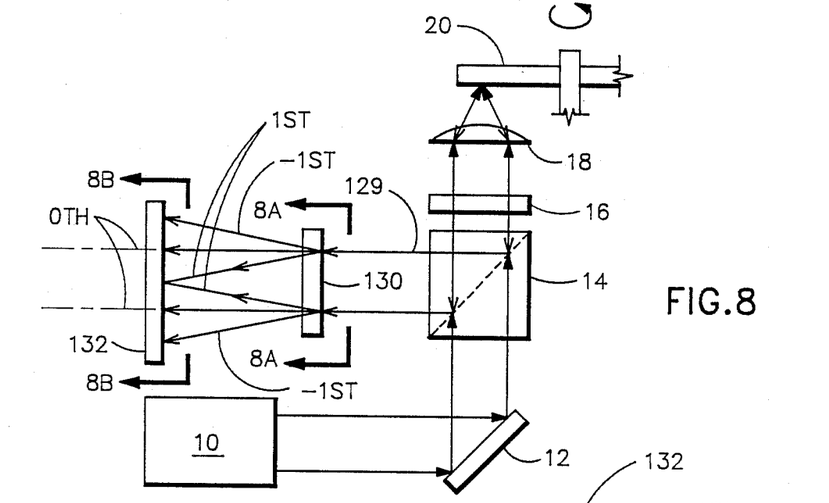
FIG. 8 is a schematic representation of a monitoring apparatus for imaging and focus error signal generation according to the second embodiment of the invention.

FIG. 8 illustrates a second embodiment of the new focusing error and tracking error generation apparatus and method of the present invention. Rather than one optical element that produces two focused beams, this detection system includes an optical element for splitting the reflected beam 129 into two beams, one of which is astigmatically focused on the plane of the detector 132, the other being defocused at the plane of the detector 132.

Figures 8A, 8B, 9:
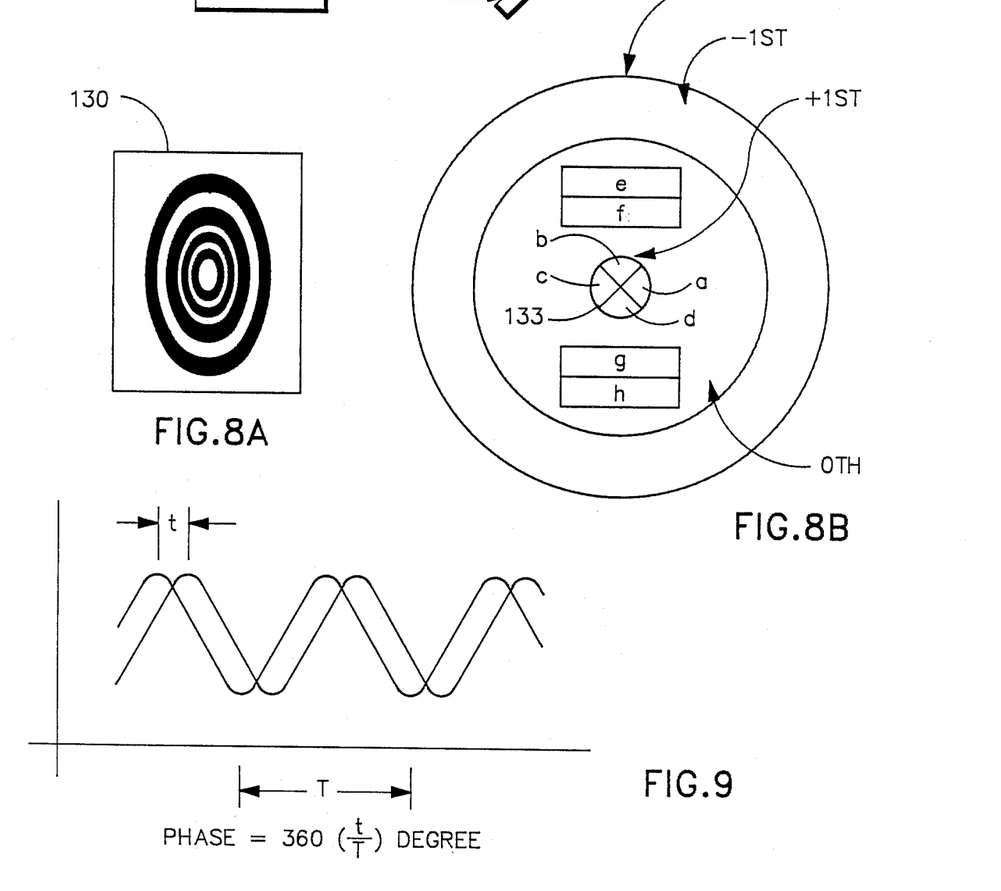
FIG. 8A is a schematic front view of an optical element of FIG. 8 taken along Line 8A—8A of FIG. 8.
FIG. 8B is a front view of the detector taken along Line 8B—8B of FIG. 8.
FIG. 9 is a phase diagram showing the phase relationship from two detectors in a focusing and tracking detection system according to the first embodiment of the invention.

The optical element 130 can comprise any of a number of components including one or more lenses and one or more diffraction gratings. A preferred component for the optical element is a zone plate element 130. The pattern of this zone plate element 130 can be produced as described more fully below. Briefly, a pattern for the plate is produced originally by a computer on a graphic device such as a pen plotter, photoplotter, CRT display or electron beam graphic output device. A preferred pattern for the second embodiment includes elliptically-shaped regions. This computer output is converted into a phase relief type optical element by methods to be discussed below. FIG. 8A is an opaque representation of the face of the optical zone plate 130 (not to scale) and is shown here to provide a conceptual visualization thereof. As pointed out hereinbelow, the optical zone plate 130 need not have opaque portions and, in general, better results in regard to light intensity are achieved with a transparent zone plate having a raised or lowered elliptical pattern.

FIG. 8B depicts the face of a modified detector plate 132 utilized in the optical system represented in FIG. 8. One of the beams generated by the optical element 130 is a converging beam similar to the astigmatic beam from a toric lens, and is designated in FIG. 8 as first order. The second beam therefrom is a defocused, nearly collimated beam with a large beam diameter and is designated in FIG. 8 as zeroth order. A third beam may also be produced by the optical element 130, being a diverging beam, and is designated in FIG. 8 as minus first order. The convergent beam and the collimated beam are sensed by the detector 132. The divergent beam in the embodiment depicted in FIG. 8 does not serve any function, and thus represents some loss of total useful intensity in the detected beams.

As in a typical optical drive, the beam diameter of the convergent beam at the quad detector, in one embodiment of the invention, is about 0.25 mm. The diameter of the collimated beam is about 4 mm, and the diameter of a divergent beam at the detector plane is about 8 mm. Since the diameter of the divergent beam is large in comparison to the other two beams, its contribution to the detected signals is small. FIG. 8B schematically illustrates the three beams (plus first, zeroth, minus first) as these appear on the plane of the detector 132 (not to scale). In a tracking system which uses pregrooves, the inner two beams produce a half moon shaped pattern which relates to the interferences resulting from the pregrooved structure on the recording medium of the disk 20. The detector depicted in FIG. 8B can also be used with tracking systems not employing pregrooved structures, such as servo bit tracking systems.

According to one embodiment of the invention, the tracking error signal is generated by the electrical detection zones by combining the signals from the detection zones denoted e, f, g and h in FIG. 8B in the following fashion:

$$(e+f)-(g+h). \tag{5}$$

Because the collimated beam is large in comparison to the magnitude of deviations of the beam axis produced, e.g., under thermal stress, or other optical faults, the tracking signal thus generated is stable and not sensitive to optical faults.

The small quadrant detector 133 in the center of the detector 132 is used to produce the astigmatic focus electrical error signal or "S" curve in the same manner as that using the signal from a conventional toric lens. However, as noted above, such error signal is sensitive to optical faults. The present invention, therefore includes using a signal from the defocused beam detectors e, f, g and h which are relatively insensitive to optical faults, in correcting or compensating for the quadrature detector signals to produce a final signal which is related to the focus, but which is relatively insensitive to optical faults. The usefulness of this aspect of the invention is related to the fact that both the defocused tracking beam and the focused focusing beam pass through the same optical components. Because the focused and defocused beams pass through the same optical components, both beams will be exposed to the same optical faults, enabling a signal from one beam to be used in compensating for the effects of optical faults on the other beam.

In the present invention, the phase relationship between the signal from the detector zones e and f of the detector 132, or similar phase relationship between the signal from the detector zones g and h, can indicate the true focus condition of the spot on the medium. Although the following discussion is in terms of using a signal from either pair of detectors (i.e. e and f or g and h), preferably signals from both pairs of detectors are additively combined resulting in a stronger total signal and, thus, a better signal-to-noise ratio. The difference signal of the two detectors indicates the sign of the focus error, while the sum of the two detectors can be used as a phase reference signal. Multiplication of both signals as in the form:

$$(e-f) \cdot (e+f) \tag{6}$$

Yields a focus error signal, as described in Braat, et al., "Position Sensing in Video Disk Readout", *Applied Optics*, Volume 17, pp. 2013–2021.

An example of the phase relationship of these signals is illustrated in FIG. 9, where the two traces represent idealized signals from detectors e and f or from detectors g and h. The phase, in radians, is the lag of one signal, with respect to the other, divided by the common period of the signals. The focus error signal as described in the Braat, et al. *Applied Optics* article, however, has a disadvantage in that the capture range of the e, f, g, h focus signal is relatively small, i.e. before the e, f, g, h focus signal provides meaningful information, the laser beam must already be in a close-to-focused condition, compared to the focus condition required to obtain a meaningful signal from the quadrature detector, which may have a capture range on the order of 100 microns or more. However, as noted above, the quadrature detector is relatively sensitive to optical faults, such as misalignment of optical components, compared to the optical fault sensitivity of the e, f, g, h focus signal.

The present invention includes using both the e, f, g, h focus signal and the quadrature detector focus signal. The quadrature detector error signal is used to directly control the focus thus maintaining the focus system sufficiently close to an in-focused condition that the e, f, g, h focus signal is meaningful (i.e. is within the e, f, g, h capture range so as to provide an indication of the true focus condition). When the optical disk drive is first made operational, the components are aligned and adjusted to initially provide the desired focus of the read/write beam with respect to the recording medium. As the system is subjected to such influences as mechanical shock or vibrations or thermal expansion, optical components become misaligned and optical faults occur as a result. As noted, the detector of the defocused beam e, f, g, h is relatively insensitive to such optical faults, while the quadrature detector is relatively more sensitive to optical faults. Thus, when optical faults cause the quadrature detector to erroneously indicate a defocused condition, the true focus condition is nevertheless provided by the e, f, g, h detector, e.g. according to Equation (6) above. According to the present invention, in such a situation, an off-set signal is combined with the quadrature focus error signal to provide a corrected signal. The offset signal is derived using the e, f, g, h signal and has a magnitude and sense such that the corrected "S" curve indicates an in-focus condition if, and only if, the e, f, g, h detector indicates an in-focus condition. The corrected quadrature error signal is relatively insensitive to optical faults because the "S" curve has been offset so as to indicate correct focus whenever the e, f, g, h signal indicates correct focus.

In summary, the process of providing a corrected error signal according to this embodiment of the invention involves the following steps:

(1) Initial setup: quadrature detector signal is calibrated such that the "S" curve indicates the true focus condition.

(2) During operation the e, f, g, h focus signal is sampled.

(3) If the e, f, g, h focus signal and the quadrature detector both indicate an unfocused condition, the focus system is controlled using the "S" curve in the usual manner to bring the beam back into the desired focus condition.

(4) If the e, f, g, h focus signal and the quadrature detector provide opposite indications of the focused condition, an offset signal is combined with the "S" curve to produce a corrected "S" curve.

In this manner, a corrected error focus signal is provided which is both relatively insensitive to optical faults and which has a relatively large capture range such as about 100 microns or more.

Figures 10, 10A:
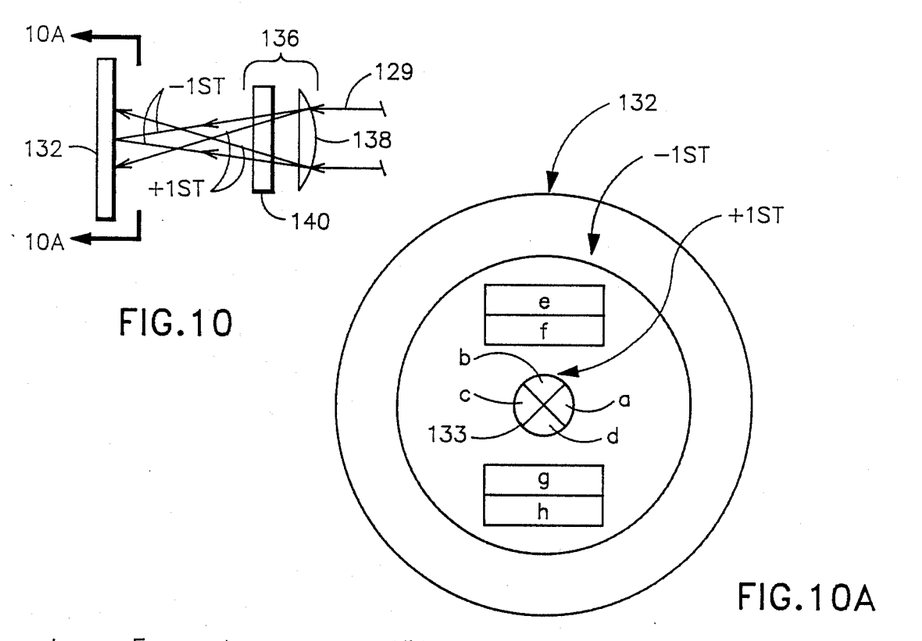
FIG. 10 is a schematic depiction of a detector configuration for sensing focus and tracking error signals which is an alternative configuration of the second embodiment of the invention.
FIG. 10A is a front view of a detector taken along Line 10A—10A of FIG. 7.

FIG. 10 illustrates another signal detection principle of the present invention. In this case, the optical element 136 includes a lens 138 in conjunction with an optical element such as zone plate 140 to image the aperture of the objective lens to the detector plane via the minus first order beam. The optical element results in splitting a portion of the beam reflected from the disk 20 into first and second beams, and also imparting astigmatism to at least one of the two beams. The lens 138 can produce very high contrast interference patterns on the detector 132. Preferably, in the embodiment depicted in FIG. 10, the optical element 136 produces little or no intensity of the zeroth order beam, thereby increasing the total useful intensity of the detected plus first order and minus first order beams. Construction of an optical element with the described characteristics is described more fully below and in conjunction with Wai-Hon Lee "High Efficiency Multiple Beam Gratings", *Applied Optics*, Vol. 18, No. 13, pp. 2152–2158, incorporated herein by reference. The minus first order beam is a converging beam used for obtaining the astigmatic focus error signal in the manner described above in connection with FIG. 8. Both beams as they appear on the detector 132 are shown in FIG. 10A. A detector 132 identical to the one shown and described for FIGS. 8 and 8B, can be used in connection with the arrangement depicted in FIG. 10.

In both the first and second embodiments, the splitting of the reflected beam into first and second beams is preferably accomplished using elliptical (including partially elliptical) zone plates. Such an elliptical zone plate can be made by a photographic method, described below, involving photoreduction and photoresist replication of an elliptical pattern. The pattern can be initially generated by, for example, a computer which drives a pen plotter, photoplotter, electron beam or CRT display or other plotting device. The characteristics of the zones which are to be plotted can be obtained by solving one or more equations which are related to the desired characteristics of the elliptical zone plate.

In relation to both embodiments of the present invention, it is well known in optics that a plate consisting of alternating opaque and transparent concentric circular zones can focus a collimated beam of light to a point. This plate is sometimes called a Fresnel zone plate. It can also be interpreted as a hologram of a spherical wave interfering with an online collimated beam. The zone plate of the present invention can be understood with the same general principle.

Figures 11, 12:
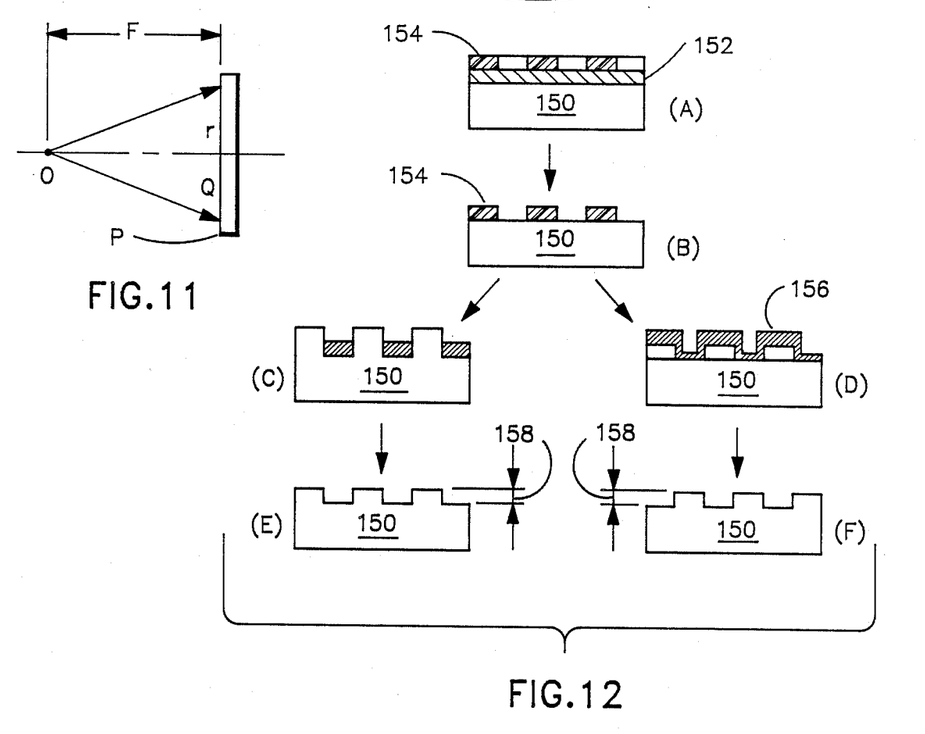
FIG. 11 is a schematic representation of a point light source and its wavefront at a plane P.
FIG. 12 is a diagramatic depiction of various stages in the construction of an elliptical zone plate.

FIG. 11 schematically depicts a spherical wave at a distance F from a point source O which can be represented mathematically as follows:

$$\phi(r) = (2\pi/\lambda)[(r^2 + F^2)^{\frac{1}{2}} - F], \quad (7)$$

where (x,y) is the phase variation of the wavefront of the spherical wave at plane P, $\lambda$ is the wavelength of the light and r is the radial distance from the origin Q. The radius $R_n$, such that $\phi(R_n)$ is equal to $2n^{90}$, is given by:

$$R_n = (n^2\lambda^2 + 2n\lambda F)^{\frac{1}{2}}. \quad (8)$$

For large F, as in most practical cases, $R_n$ can be represented by:

$$R_n = (2n\lambda F)^{\frac{1}{2}}. \quad (9)$$

The zone plate with focal lengths $F_x$ and $F_y$ is obtained by plotting ellipses with major and minor axes given by:

$$R_{xn} = (2n\lambda F_x)^{\frac{1}{2}}. \quad (10)$$

$$R_{yn} = (2n\lambda F_y)^{\frac{1}{2}}. \quad (11)$$

The difference in radii of curvature along the two axes produces astigmatism similar to that produced by a conventional toric lens.

In connection with the first embodiment of this invention, the computer-generated astigmatic element is a combination of a positive cylinder along x direction and a negative cylinder in the y direction. Mathematically the phase of such an element can be written as $$phase = \pi(x^2 - y^2)/\lambda f' \quad (12)$$

where f' is the focal length of the astigmatic element. When this element is used in connection with a spherical lens with focal length F'', the beam along x will focus at $f_x$ which is determined by $$f_x^{-1} = f'^{-1} + F''^{-1} \quad (13)$$

and the beam along y is focused at $f_y$ given by $$f_y^{-1} = -f'^{-1} + 30\ F''^{-1} \quad (14)$$

Computer-generated optical elements create many diffracted orders. The +1 order will have the phase given above and the −1 order will have its conjugate namely $$conjugate\ phase = -\pi(x^2 - y^2)/\lambda f' \quad (15)$$

These two diffracted orders produce the pattern for the focus error signals as shown in FIG. 6.

The focal length f' of the astigmatic element is determined from the focus range required by the system. Suppose that F'' is equal to 40 mm. In order to have 3 mm separation between the two astigmatic foci the equations above show that f' is about 1 meter.

To obtain the astigmatic pattern in FIG. 6 we must rotate the astigmatic element by 45°. The phase in such a case is given by $$phase = 2\pi xy/\lambda f' \quad (16)$$

To make such an element it is necessary to determine the interference of such a wavefront with a slight tilted collimated beam. The positions of the fringes are located by solving the following equation $$2\pi d/\lambda F' + 2\pi xy/\lambda f = 2\pi n \quad (17)$$

where d is the separation of the first order from the zero order.

In generating a zone plate usable in connection with the second embodiment of the invention, for the purpose of illustration, it is assumed that in FIG. 10 the distance of the readout objective lens is at a distance D' from the lens 138 which has a focal length F'. The zone plate 140 has an average focal length of f.

It is also assumed that the detector 132 is located at a distance D from the lens 138. The relationship among all of these variables is given by the following equations:

$$f^{-1} + F^{-1} = 2D^{-1}, \quad (18)$$

$$-f^{-1} + F^{-1} = D^{-1}. \quad (19)$$

It is possible to determine the focal lengths F' and f from the information on D. This is by no means the only relationship that exists between F' and f. The astigmatic focal lines in the elliptical zone plate 140 are mainly determined by the range of the focus errors. The distance needed between the two astigmatic focal lines (AD) is approximately given by:

$$AD = 2K(f/g)^2, \quad (20)$$

where K is the focus control range, g is the focal length of the objective lens and f is the average focal length of the zone plate. As an example, for K=30 micrometers, g=4 mm and f=30 mm, the AD is calculated to be about 3.4 mm.

An advantage of the present invention is the simplicity of fabrication of an elliptical zone plate element 130. The manufacture of this element is similar to the process required in the fabrication of microelectronic components.

FIG. 12 depicts the sequence of steps involved in alternate methods for producing the phase relief structure for a zone plate element. A glass substrate 150 is first coated with a light sensitive material 152 such as a photoresist or photopolymer. A mask 154 containing the computer-plotted and usually photographically reduced image of the zone plate pattern that is to appear on the zone plate element 130 or 140 is disposed over the coating material 152. A source of light, such as ultraviolet light, is used to expose the light sensitive material 152 through the mask 154 (FIG. 12A). After exposure and a proper development process for the photosensitive material 152, a structure is derived such as shown in FIG. 12B. This structure can then be subjected to an etching process (such as with hydrofluoric acid or by plasma etching with appropriate gases) to arrive at a surface profile as shown in FIG. 12C. As indicated above, it is preferable that the zone plate remain transparent, as shown, but the pattern can also be made opaque in any desired manner.

An alternative method to fabricate the phase structure is to deposit a layer 156 of transparent silicon monoxide (SiO), silicon dioxide (SiO), or magnesium fluoride (MgF) on the structure of FIG. 12B to arrive at that shown in FIG. 12D. Removing the photoresist layer from the structure shown in FIG. 12D will produce the phase structure shown in FIG. 12F. As long as the thickness of the relief is correct according to the teaching contained in an article entitled "High Efficiency Multiple Beam Gratings", by W. H. Lee, *Applied Optics* Volume 18 pp. 2152-2158 1979 the structures shown in FIGS. 12E and 12F will have identical properties insofar as the ability of such to serve as the zone plate structure described hereinabove. The zeroth order can be suppressed by making the layer which corresponds to the computer generated pattern 154 to have a thickness 158 about the wavelength of the laser light source.

The manner of using the present invention will now be described. According to the first embodiment of the invention, depicted in FIG. 4, the beam reflected from the data disk 66 is passed through the optical element 60 described above to produce first and second beams substantially focused on first and second detectors 74, 76. The first and second detectors produce signals k, l, m, n, p, q, r and s related to the amount of light which falls on each quadrant of the respective quadrature detectors. These signals are combined according to Equations 3 and 4 to provide focus and tracking signals respectively which are used to control the tracking and focus of the read/write beam as described above in connection with the first embodiment.

According to the second embodiment depicted in FIGS. 8 and 10, a portion of a laser beam reflected from a data disk 20 is passed through the optical element 130, 136, as described above, to produce patterns of light on an optical detector 132. Signals a, b, c, d, e, f, g and h from the optical detector, as depicted in FIGS. 8B and 10A, are combined to produce a tracking error signal and a focus error signal. The tracking error signal is used to move a tracking device such as a controllable carrier mirror or arm so as to position the focused spot of the read/write beam onto a desired position of the data disk 20. The focus error signal is used to position the objective lens 18 to a position which results in providing a desired degree of focus of the read/write beam on the data plane of the disk 20.

In all aspects of the present invention, signals can be combined or compensated whether by way of addition, subtraction, multiplication or other combinations, using well-known electronic circuits, such as adding circuits, difference circuits or the like, or can be combined using computers or microprocessors.

Although the present invention has been described with reference to certain embodiments, it should be appreciated that further modifications can be effected within the spirit and scope of the invention.

What is claimed is:

1. Apparatus useful in maintaining focus in a disk data-storage system, comprising:
   radiation source means for producing a read/write beam of radiation;
   focus means for focusing said read/write beam on the disk, wherein a portion of said read/write beam is reflected from the disk to produce a reflected beam;
   optical element means for simultaneously producing from said reflected beam, first and second beams, said first beam at a detector plane having at least a portion non-overlapping relation to said second beam;
   first detector means at said detector plane for producing a first signal electrically representative of said first beam;
   second detector means to produce a second signal electrically representative of said second beam;

means for combining said first signal and said second signal to produce a third signal, said third signal varying as a function of said degree of focus; and a fourth signal produced using said second detector means, said fourth signal varying as a function of radial tracking of said read/write beam.

2. Apparatus useful in controlling focus and tracking in a disk data-storage system, comprising:

radiation source means for producing a read/write beam of radiation;

controllable focus means for focusing said read/write beam on the disk wherein a portion of said read/write beam is reflected to produce a reflected beam;

a single optical element for producing at least a first beam converging to form a first image on a first image plane and a second beam converging to form a second image on a second image plane, whereby:

(a) said first image changes in a mirror symmetric fashion with respect to changes in said second image when there is a change in said focusing of said read/write beam, (b) said first image changes in a mirror symmetric fashion with respect to changes in said second image when there is a change in the tracking of said read/write beam with respect to the disk, (c) said first image changes in a parallel fashion with respect to changes in said second beam when there is a change in the optical axis of said reflected beam;

first detector means responsive to the changes in said first image to provide a first plurality of signals electrically representative of said changes in said first image;

second detector means responsive to the changes in said second image to provide a second plurality of signals electrically representative of said changes in said second image;

first means for combining said first plurality of signals and said second plurality of signals to provide a third signal electrically representative of error associated with changes in focus, said third signal being used to directly control focus of said controllable focus means;

second means for combining said first plurality of signals and said second plurality of signals to provide a fourth signal electrically representative of error associated with changes in tracking, said fourth signal being used to position a portion of said read/write beam relative to the disk;

first control means responsive to said third signal for changing the focal plane of said focus means; and second control means responsive to said fourth signal for changing the radial tracking of said read/write beam relative to the disk.

3. Apparatus, as claimed in claim 2, wherein said first detector means and said second detector means are contained in a single compact detector apparatus.

4. Apparatus, as claimed in claim 2, wherein said single optical element further produces a third beam converging to form a third image on a third image plane, and further comprising a third detector means responsive to changes in said third image to provide a signal electrically representative of modulation of said read/write beam by the disk.

5. Apparatus, as claimed in claim 2, wherein:

said first detector means comprises a quadrature detector providing first, second, third, and fourth detector outputs;

said second detector means comprises a quadrature detector providing fifth, sixth, seventh and eighth detector outputs.

6. Apparatus, as claimed in claim 5, wherein:

said first means for combining comprises means for adding the difference of the sums of the first and third detector outputs and second and fourth detector outputs to the difference of the sums of the sixth and eighth detector outputs and the fifth and seventh detector outputs; and said second means for combining comprises means for adding the difference of the sums of said first and fourth detector outputs and said second and third detector outputs to the difference of the sums of said sixth and seventh detector outputs and said fifth and eighth detector outputs.

7. Apparatus, as claimed in claim 2, wherein:

said single optical element includes means for providing an astigmatizing influence on said first beam and said second beam.

8. Apparatus, as claimed in claim 2, wherein:

said single optical element includes means for providing rotation of the diffraction pattern in the first beam with respect to the diffraction pattern in the second beam.

9. Apparatus, as claimed in claim 2, wherein:

said single optical element comprises a zone plate.

10. Apparatus, as claimed in claim 2, wherein:

said first image plane and said second image plane are coplaner.

11. Apparatus useful in monitoring focus and tracking of a disk data-storage system, comprising:

radiation source means for producing a read/write beam of radiation wherein a portion of said read/write beam is reflected from the disk to produce a reflected beam;

an elliptical zone plate for producing a first beam converging to form a first image on a first image plane and a second beam converging to form a second image on a second image plane, where by:

(a) said first image changes in a mirror symmetric fashion with respect to changes in said second image when there is a change in said focusing of said read/write beam, (b) said first image changes in a mirror symmetric fashion with respect to changes in said second image when there is a change in the tracking of said read/write beam with respect to the disk, (c) said first image changes in a parallel fashion with respect to changes in said second beam when there is a change in the optical axis of said reflected beam;

first detector means responsive to the changes in said first image to provide a first plurality of signals electrically representative of said changes in said first image;

second detector means being responsive to the changes in said second image to provide a second plurality of signals electrically representative of said changes in said second image; and first means for combining said first plurality of signals and said second plurality of signals to provide a third signal electrically representative of error associated with changes in focus, said third signal being used to directly focus controllable focus means.

12. Apparatus, as claimed in claim 11, wherein: said elliptical zone plate includes means for providing rotation of the diffraction pattern in said first beam with respect to the diffraction pattern in said second beam.

13. Apparatus, as claimed in claim 11, wherein: said first detector means and said second detector means are contained in a single compact detector apparatus.

14. Apparatus, as claimed in claim 11, wherein: said elliptical zone plate further produces a zero order beam converging to form a third image on a third imade plane, and further comprising a third detector means responsive to changes in said third image to provide a signal electrically representative of modulation of said read/write beam by the disk.

15. Apparatus, as claimed in claim 14, wherein: said first image plane, said second image plane and said third image plane are coplaner.

16. Apparatus, as claimed in claim 11, wherein: said elliptical zone plate includes means for providing an astigmatizing influence on said first beam and said second beam.

17. Apparatus useful in controlling focus and tracking in a disk data-storage system, comprising:
radiation source means for producing a read/write beam of radiation;
controllable focus means for focusing said read/write beam on the disk, wherein a portion of said read/write beam is reflected to produce a reflected beam;
a single element for producing a first beam and a second beam from at least a portion of said reflected beam, said first and second beams being astigmatically focused, the astigmatic line of said first beam being mirror symmetrically oriented with respect to the astigmatic line of said second image, the diffraction pattern of said first beam being mirror symmetrically rotated with respect to the diffraction pattern of said second beam;
first detector means being responsive to changes in said first image to provide a first plurality of signals electrically representative of said changes in said first image;
second detector means being responsive to changes in said second image to provide a second plurality of signals electrically representative o said changes in said second image;
first means for combining said first plurality of signals and said second plurality of signals to provide a focusing signal electrically representative of error associated with changes in focusing of said read/write beam, said focusing signal being used to directly control said controllable focus means;
second means for combining said first plurality signals and said plurality of signals to provide a tracking signal electrically representative of error associated with tracking of said read/write beam with respect to said disk, said tracking signal being used to position a portion of said read/write beam relative to the disk;
first control means responsive to said focusing signal being adapted to change the focal plane of said controllable focus means; and
second control means responsive to said tracking signal being adapted to change the radial tracking of said read/write beam relative to the disk.

18. Apparatus, as claimed in claim 17, wherein: said single element for producing a first and second beam comprises an elliptical zone plate.

19. Apparatus, as claimed in claim 17, wherein: said first detector means comprises a quadrature detector providing first, second, third, and fourth detector outputs; and
said second detector means comprises a quadrature detector providing fifth, sixth, seventh, and eighth detector outputs.

20. Apparatus, as claimed in claim 19, wherein: said first means for combining comprises means for adding the difference of the sums of the first and third detector outputs and second and fourth detector outputs to the difference of the sums of the sixth and eighth detector outputs and fifth and seventh detector outputs; and
said second means for combining comprises means for adding the difference of the sums of said first and fourth detector outputs and said second and third detector outputs to the difference of the sums of said sixth and seventh detector outputs and said fifth and eighth detector outputs.

* * * * *